(12) United States Patent
Blanco

(10) Patent No.: US 7,303,476 B2
(45) Date of Patent: *Dec. 4, 2007

(54) METHOD AND APPARATUS FOR CREATING AND PLAYING SOUNDTRACKS IN A GAMING SYSTEM

(75) Inventor: Victor Keith Blanco, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

This patent is subject to a terminal disclaimer.

(21) Appl. No.: 10/980,713

(22) Filed: Nov. 2, 2004

(65) Prior Publication Data

US 2005/0064935 A1  Mar. 24, 2005

Related U.S. Application Data

(60) Continuation of application No. 10/778,643, filed on Feb. 12, 2004, now Pat. No. 6,878,067, which is a division of application No. 09/802,661, filed on Mar. 9, 2001, now abandoned.

(51) Int. Cl.
*A63F 9/24* (2006.01)
(52) U.S. Cl. ...................................... 463/43
(58) Field of Classification Search ............ 463/30–32, 463/35–38, 43–44
See application file for complete search history.

(56) References Cited

U.S. PATENT DOCUMENTS 4,296,476 A   10/1981   Mayer et al.
4,432,067 A   2/1984    Nielsen
4,905,280 A   2/1990    Wiedemer
5,362,068 A   11/1994   Liu
5,382,983 A   1/1995    Kwoh et al.
5,459,487 A   10/1995   Bouton
5,475,835 A   12/1995   Hickey
5,550,575 A   8/1996    West et al.
5,551,701 A   9/1996    Bouton et al.
5,557,541 A   9/1996    Schulhof et al.
5,558,339 A   9/1996    Perlman
5,587,546 A   12/1996   Kato et al.
5,592,609 A   1/1997    Suzuki et al.
5,592,651 A   1/1997    Rackman (Continued)

FOREIGN PATENT DOCUMENTS

CA    2201276    9/1998

(Continued)

OTHER PUBLICATIONS

"CES: Bill Gates zeigt die Xbox" Golem.de 'Online! Jan. 6, 2000 Retrieved from the internet: url:http://dyn1.golem.de/cgi-bin/usisapi.dll/forprint??id11561>retrieved Jun. 18, 2004.

(Continued)

*Primary Examiner*—Kim Nguyen

(57) ABSTRACT

A gaming system includes a game console that executes an application that creates and plays soundtracks through the gaming system. The application allows a user to create soundtracks by copying audio tracks from one or more audio sources. A user-created soundtrack can be associated with a particular game such that the user-created soundtrack is played during execution of the game instead of the game's default soundtrack. During execution of a game, a user may change the soundtrack being played.

20 Claims, 12 Drawing Sheets

U.S. PATENT DOCUMENTS

| | | |
|---|---|---|
| 5,598,276 A | 1/1997 | Cookson et al. |
| 5,611,066 A | 3/1997 | Keele et al. |
| 5,624,316 A | 4/1997 | Roskowski et al. |
| 5,634,849 A | 6/1997 | Abecassis |
| 5,649,862 A | 7/1997 | Sakaguchi et al. |
| 5,659,742 A | 8/1997 | Beattie et al. |
| 5,680,323 A | 10/1997 | Barnard |
| 5,706,510 A | 1/1998 | Burgoon |
| 5,716,273 A | 2/1998 | Yuen |
| 5,726,909 A | 3/1998 | Krikorian |
| 5,735,744 A | 4/1998 | Okamoto |
| 5,745,574 A | 4/1998 | Muftic |
| 5,752,883 A | 5/1998 | Butcher et al. |
| 5,791,992 A | 8/1998 | Crump et al. |
| 5,797,752 A | 8/1998 | Umezawa |
| 5,798,921 A | 8/1998 | Johnson et al. |
| 5,841,979 A | 11/1998 | Schulhof et al. |
| 5,876,286 A | 3/1999 | Lee |
| 5,878,134 A | 3/1999 | Handelman et al. |
| 5,892,900 A | 4/1999 | Ginter et al. |
| 5,896,125 A | 4/1999 | Niedzwiecki |
| 5,915,238 A | 6/1999 | Tjaden |
| 5,917,256 A | 6/1999 | Broadbent, II |
| 5,918,223 A | 6/1999 | Blum et al. |
| 5,935,005 A | 8/1999 | Tsuda et al. |
| 5,946,278 A | 8/1999 | Tower |
| 5,969,283 A | 10/1999 | Looney et al. |
| 5,973,683 A | 10/1999 | Cragun et al. |
| 5,978,920 A | 11/1999 | Lee |
| 5,980,261 A | 11/1999 | Mino et al. |
| 5,993,319 A | 11/1999 | Aoyama |
| 6,001,015 A | 12/1999 | Nishiumi et al. |
| 6,005,597 A | 12/1999 | Barrett et al. |
| 6,009,433 A | 12/1999 | Kurano et al. |
| 6,011,758 A | 1/2000 | Dockes et al. |
| 6,012,068 A | 1/2000 | Boezeman et al. |
| 6,025,869 A | 2/2000 | Stas et al. |
| 6,031,795 A | 2/2000 | Wehmeyer |
| 6,065,020 A | 5/2000 | Dussud |
| 6,093,880 A | 7/2000 | Arnalds |
| 6,115,079 A | 9/2000 | McRae |
| 6,119,116 A | 9/2000 | Rose |
| 6,122,617 A | 9/2000 | Tjaden |
| 6,128,255 A | 10/2000 | Yankowski |
| 6,128,625 A | 10/2000 | Yankowski |
| 6,147,940 A | 11/2000 | Yankowski |
| 6,161,185 A | 12/2000 | Guthrie et al. |
| 6,181,336 B1 | 1/2001 | Chiu et al. |
| 6,189,096 B1 | 2/2001 | Haverty |
| 6,224,485 B1 | 5/2001 | Dickinson et al. |
| 6,230,320 B1 | 5/2001 | Gakumura |
| 6,280,327 B1 | 8/2001 | Leifer et al. |
| 6,280,329 B1 | 8/2001 | Kondo et al. |
| 6,298,441 B1 | 10/2001 | Handelman et al. |
| 6,299,535 B1 | 10/2001 | Tanaka |
| 6,309,301 B1 | 10/2001 | Sano |
| 6,312,336 B1 | 11/2001 | Handelman et al. |
| 6,320,320 B1 | 11/2001 | Bailey, III et al. |
| 6,393,430 B1 | 5/2002 | Van Ryzin |
| 6,396,531 B1 | 5/2002 | Gerszberg et al. |
| 6,464,585 B1 | 10/2002 | Miyamoto et al. |
| 6,468,160 B2 | 10/2002 | Eliott |
| 6,488,508 B2 | 12/2002 | Okamoto |
| 6,502,111 B1 | 12/2002 | Dussud |
| 6,520,890 B2 | 2/2003 | Hsu |
| 6,535,269 B2 | 3/2003 | Sherman et al. |
| 6,599,194 B1 | 7/2003 | Smith et al. |
| 6,601,171 B1 | 7/2003 | Carter et al. |
| 6,712,704 B2 | 3/2004 | Eliott |
| 6,716,102 B2 | 4/2004 | Whitten et al. |
| 6,769,989 B2 | 8/2004 | Smith et al. |
| 6,875,021 B2 | 4/2005 | Okamoto |
| 6,928,433 B2 | 8/2005 | Goodman et al. |
| 6,935,952 B2 | 8/2005 | Walker et al. |
| 7,019,205 B1 | 3/2006 | Fujisawa et al. |
| 2001/0004609 A1 | 6/2001 | Walker et al. |
| 2001/0007824 A1 | 7/2001 | Fukuda |
| 2002/0077177 A1 | 6/2002 | Elliott |
| 2002/0121297 A1 | 9/2002 | Li et al. |
| 2002/0152377 A1 | 10/2002 | Bauman |
| 2003/0008715 A1 | 1/2003 | Huber et al. |
| 2003/0077557 A1 | 4/2003 | Okamoto |
| 2003/0078097 A1 | 4/2003 | Okamoto |
| 2003/0227473 A1 | 12/2003 | Shih et al. |
| 2004/0005924 A1 | 1/2004 | Watatbe et al. |
| 2004/0162137 A1 | 8/2004 | Eliott |

FOREIGN PATENT DOCUMENTS

| | | |
|---|---|---|
| DE | 10046437 | 4/2002 |
| EP | 0 809 214 | 11/1997 |
| EP | 0889420 | 1/1999 |
| EP | 0 998 966 | 5/2000 |
| EP | 1035706 | 9/2000 |
| EP | 1126425 | 8/2001 |
| FR | 2 743 434 | 7/1997 |
| JP | 3135636 | 6/1991 |
| JP | 7160467 | 6/1995 |
| JP | 7249283 | 9/1995 |
| JP | 8016554 | 1/1996 |
| JP | 10243015 | 9/1998 |
| JP | 10327147 | 12/1998 |
| JP | 11207034 | 8/1999 |
| JP | 11237941 | 8/1999 |
| JP | 11317061 | 11/1999 |
| JP | 2000149386 | 5/2000 |
| JP | 2000157724 | 6/2000 |
| JP | 2000228051 | 8/2000 |
| JP | 2000511378 | 8/2000 |
| JP | 2000511378 T | 8/2000 |
| JP | 2000348466 | 12/2000 |
| WO | WO9714151 | 4/1997 |
| WO | WO 98/56179 | 12/1998 |
| WO | WO0033672 | 6/2000 |
| WO | WO 00/40027 | 7/2000 |
| WO | WO 00/51036 | 8/2000 |
| WO | WO0051036 | 8/2000 |
| WO | WO 01/05477 A2 | 1/2001 |
| WO | WO 01/08148 | 2/2001 |
| WO | WO 01/84768 | 11/2001 |
| WO | WO0183055 A3 | 11/2001 |
| WO | WO0184768 | 11/2001 |

OTHER PUBLICATIONS

"PlayStation 2 Instruction Manual" 'Online! 2000 Sony Computer Entertainment Retrieved from the internet: url:www.playstation.com. retreived on Jun. 18, 2004.

PS2 Frequently Asked Questions' All Playstation2 'Online! Jul. 29, 2000 Retrieved from the Internet: URL:http://www.allps2.net/ps2_faq.html>retrieved on Jun. 18, 2004.

"Interviews—John Gildred of Indrema on the L600" Planet GeForce Interview by Christopher "Razor" Gordon Oct. 19, 2000, 5 pages.

Daily Radar.com; Web page printout Nov. 13, 2000 Review of "Metropolis Street Racer" game 5 pages.

Greg Suarez; "Sony PlayStation 2" The Digital Bits 'Online! Nov. 15, 2000 retrieved from the internet: URL:http://www.thedigitalbits.com/reviews/ps2/sonyps2*. html>retrieved on Jun. 18, 2004.

Links 386CD; 1995 Access Software Inc. pp. 1-87.

Melissa J Perenson; "Play Back Media Your Way" PC World 'Online! Jun. 1, 2000 Retrieved form the Internet: url:http://www.pcworld.com/resource/printable/0aid1700100.asp. retrieved on Jul. 8, 2004.

Paul Thurrott; "Windows Media Player 7 reviewed" Winsupersite 'Onlilne! Aug. 15, 2000 Retireved formt he internet: URL:http://www.winsupersite.com/reviews/wmp7.asp>retrieved on Jun. 18, 2004.
Sega Enterprises; User Manual "Metropolis Street Racer" game 2000 18 pages.
Stallings; Cryptography and network security: Principles and Practice Second Edition Prentice Hall 1999; pp. 330 and 333-338.
Press Pass "Xbox to Deliver Ultimate Console Gaming Experience" San Jose Ca Mar. 10, 2000, 3 pages 2001.
c/net News.com; "US version of Playstation2 to have modem hard drive" By Bloomberg News Apr. 14, 2000 2 pages.
IGN.com; "Waht is the 64DD?" Sep. 17, 1997 9 pages.
IGN.com; "The 64DD: Nintendo's Disk Drive—Everything you ever wanted to know about the N64's first major add-on" Jan. 28, 1997, 7 pages.
IGN.com; "The 64DD Connection-Here's how the 64DD and the Nintendo 64 connect" Oct. 20, 1999, 5 pages.
IGN.com; "IGN64's Ultimate 64DD FAQ-Everything you ever wanted to know about the upcoming disk drive add-on" Updated: 12/13 Dec. 15, 1999, 12 pages.
Rick Lehrbaum; "Linux fuels game console plus" ZDNetUK News Linux Devices.com Special to ZDNet Jul. 7, 2000, 3 pages.
Takahashi; "Microsoft goes gaming. (product Development)" Electronic Business May 2000, 2 pages.
Todd Mowatt; "Indrema: Linux-Based Console" CNET Gamecenter.com Aug. 11, 2000, 2 pages.
Daniel Quinlan: "Filesystem Hierarchy Standard-Version 2.0"'Online! Oct. 26, 1997 Retrieved from the Internet: URL: http://www.lisoleg.net/lisoleg/fs/fhs.pdf>retrieved on Nov. 18, 2004.
Jones: "Garbage Collection", pp. 171-173, Inter-Generational Pointers.
Unknown: "DexDrive Manual", Gameshark, 'Online! 1998. pp. 1-15, Retrieved from the Internet: URL: http://www.angelfire.com/games/winospsxdexdrive/dexdrive.pdf>.
"DFU Verbindung herstellen" FAQ, Online! XP002318226 Retrieved from the Internet: URL: www.puretec.de>'retrieved on 2000!*whole document*.
Sherman S A et al.: "Secure Network Access Using Multiple Applications of AT&T's Smart Card" AT&T Technical Journal, American Telephone and Telegraph Co. New York, US, vol. 73, No. 5. Sep. 1, 1994, pp. 61-72, XP000475912 ISSN: 8756-2324 *p. 67*.
Schneier, B. "Applied Cryptography", Applied Cryptography. Protocols, Algorithms and Source Code in C, New York, John Wiley & Sons, US, 1996, pp. 574-577.
Schneier, "Applied Cryptography," John Wiley & Sons, Second Edition, 1996, pp. 32 and 33.
Getting Started Windows98, 2nd Edition, Microsoft Corporation, pp. 80-81 and 87-90.
Hall et al., "Remote Electronic Gambling" Computer Security Applications Conference, 1997. Proceedings., 13th Annual Dec. 8-12, 1997, pp. 232-238.
Jimbo et al., "Optimal Authentication Systems and Combinatorial Designs" Information Theory, IEEE Transactions on vol. 36, Issue 1, Jan. 1990 pp. 54-62.
Nacira et al., "Secured Net-BANKING by /spl thera/-VIGENERE in Syverson's Protocol" Computer Systems and Applications, 2005. The 3rd ACS/IEEE International Conference on 2005. p. 67.
"TV Incapable of Displaying Images", Nikkel Electronics, May 22, 2000 Issue, Japan, Nikkei Business Publications, Inc., May 22, 2000, No. 770, pp. 141-158.
"PlayStation 2, Dreamcast, and 64DD: Aiming at Increasing Customers by Integration with the Net", Nikkei Trendy, No. 169, Japan, Nikkei Home Publishing Inc., Jul. 25, 2000, Extra Edition/Serial No. 169, pp. 16-19.
"XBOX, ASCII, the March Issue, 2001 (The Anatomy of XBOX which is Inaccessable to the Readers of Game Magazines: The Latest Information of the War for TV Viewers at the Present Stage in 21st Century", ASCII Corporation., Mar. 1, 2001, vol. 25, No. 3, pp. 249-264.
U.S. Appl. No. 60/201,163, filed on May 2, 2000, Shih, et al., "Real Time Incorporation of Personalized Audio Into Video Game".
U.S. Appl. No. 60/252,760, filed on Nov. 22, 2000, Shih, et al., "Real Time Incorporation of Personalized Audio into Video Game".
"Metropolis Street Racer", retrieved at <<http://en.wikipedia.org/wiki/Metropolis_Street_Racer>>, on Jul. 9, 2006, Sega, Jan. 17, 2001, pp. 3.
Bolosky et al., "Single Instance Storage in Windows 2000" Proceedings of the Usenix Windows Systems Symposium, vol. 4, Aug. 3, 2000, pp. 13.21.
"Sega Dreamcast User Manual", retrieved on Oct. 16, 2006 at <<http://www/gamemanuals.net/download/11eed12c65503f83e99b0c58bd7450bd/Dreamcast_(EN)_[Hardware].pdf>>, The Game Manual, Sep. 9, 1999, pp. 2-31.
"The 64DD: Nintendo's Disk Drive", (Jan. 28, 1998).
Sega of America, Inc., ""The Game Manual Sega Dreamcast"", www.sega.com, 30 pages.
Bolosky, et al., "Single Instance Storage in Windows 2000", Usenix Association, Proceedings of the 4th USENIX Windows Systems Symposium, Aug. 3-4, 2000, Seattle, WA, 15 pages.
"Real time incorporation of personalized audio into video game", U.S. Appl. No. 60/201,163, filed May 2, 2000.
""the 64DD: Nintendo's disk drive"", ign.com, (Jan. 28, 1998).
"IGN64's ultimate 64DD FAQ", ign.com, (Dec. 15, 1999).
""What is the 64DD?"", ign.com, (Sep. 17, 1997).
user manual "Metropolis Street Racer", www.replacementdocs.com. (Jul. 9, 2006).
"Review of "Metropolis street racer"", dailyrader.com, (Nov. 13, 2000).

METHOD AND APPARATUS FOR CREATING AND PLAYING SOUNDTRACKS IN A GAMING SYSTEM

RELATED APPLICATIONS

This application is a Continuation of application Ser. No. 10/778,643, filed Feb. 12, 2004, now U.S. Pat. No. 6,878,067 entitled "Method and Apparatus for Creating and Playing Soundtracks in a Gaming System", and incorporated herein by reference. That application is a divisional of application Ser. No. 09/802,661, filed Mar. 9, 2001, now abandoned entitled "Method and Apparatus for Creating and Playing Soundtracks in a Gaming System", which is also incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to gaming systems and, more particularly, to the creation of soundtracks using a gaming system and to the playback of soundtracks using a gaming system.

BACKGROUND

Gaming systems currently available on the market are capable of playing game discs, music CDs, and movie DVDs from a disc drive. For example, the Playstation® 2 gaming system from Sony Corporation provides the ability to play games, music, and video titles from a disc inserted in the console. Certain gaming systems also provide a modem or other mechanism for establishing an online connection to facilitate online gaming.

Current gaming systems play games that typically include a game soundtrack. The game soundtrack is stored on a disc along with the game (i.e., a game disc). This game soundtrack includes music that is created by or selected by the game developer. If the user of the gaming system dislikes the game soundtrack or grows tired of the same soundtrack being played repeatedly, some gaming systems allow the user to launch the game from the game disc, and then replace the game disc with an audio CD that is played by the gaming system while the game is executed. However, if the game requires additional information from the game disc (e.g., when changing from one level to another), the user must remove the audio CD and re-insert the game disc. After the additional information has been retrieved from the game disc, the game disc can be removed from the gaming system and replaced with the audio CD. This switching of discs disrupts the gaming experience and is a nuisance to the user.

The system and method described herein addresses these limitations by providing a mechanism to create soundtracks in a gaming system and to select a soundtrack to be played while executing a particular game.

SUMMARY

The method and apparatus described herein provide the ability to create, edit, and play soundtracks in a gaming system. The soundtracks include one or more audio tracks copied or retrieved from one or more audio sources (such as an audio CD, an audio DVD, a game disc, or an online source containing audio files). Soundtracks are stored on a hard disk drive in the gaming system and can be played back through the gaming system. Additionally, soundtracks stored in the gaming system can be associated with a particular game such that the soundtrack is played (instead of the game's default soundtrack) while the game executes. This system allows the user to choose or create a soundtrack based on the user's audio preferences, and does not limit the user to the game soundtrack provided by the game developer.

In the described implementation, the gaming system includes a game console and one or more controllers. The game console is equipped with a hard disk drive, a portable media drive, and broadband connectivity. A console application stored on the hard disk drive is loaded when the game console is powered on. The console application presents a menu hierarchy that includes various soundtrack creation and soundtrack selection menus. The soundtrack creation menu allows the user to select various audio tracks to be included in a soundtrack. The soundtrack selection menu allows the user to select a soundtrack for playback or for associating with a particular game such that the soundtrack is played when the particular game is launched.

When a game is launched, the gaming system determines whether the launched game has a user-associated soundtrack. If so, the user-associated soundtrack is retrieved from the hard disk drive and played while the game is executed. If the launched game does not have a user-associated soundtrack, the gaming system either 1) plays the default game soundtrack provided by the game developer; or 2) allows the user to select the soundtrack to be played while the game is executed. The user of the gaming system can change soundtracks in the middle of a game by pausing the game and selecting a different soundtrack. The gaming system then resumes execution of the game and begins playing the newly selected soundtrack.

DETAILED DESCRIPTION

The method and apparatus discussed herein allows users to create and play soundtracks in a gaming system. A soundtrack can be played by itself or played at the same time a game is executed, thereby replacing the soundtrack provided with the game. The soundtrack is created by copying audio data (or audio tracks) from one or more audio sources and storing the audio data as a soundtrack on a hard disk drive. The audio sources may include audio CDs, audio DVDs, game discs, and online sources that contain music files available for download. Since the soundtrack is played from the hard disk drive, it is not necessary to remove the game disc or other media from the gaming system prior to playing the soundtrack.

Figure 1:
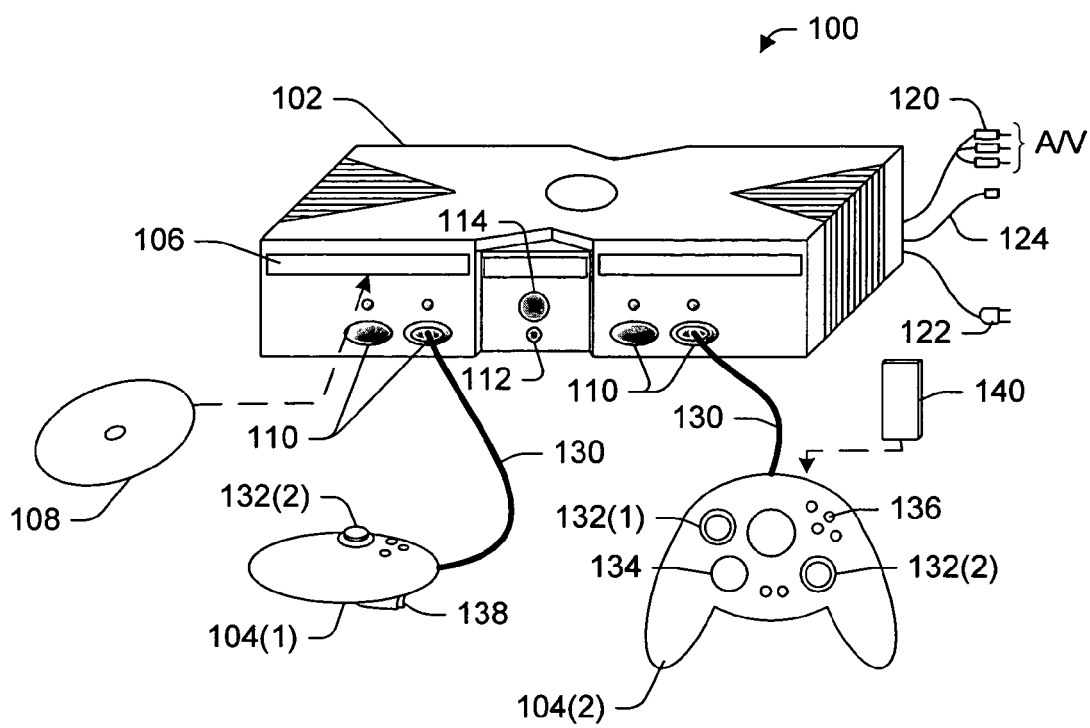
FIG. 1 illustrates a gaming system that implements a uniform media portal architecture.

FIG. 1 shows an exemplary gaming system 100. It includes a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

The game console 102 has four slots 110 on its front face to support up to four controllers 104, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller 104 is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD, from the hard disk drive, or from an online source.
2. Digital music played from a CD in the portable media drive 106, from a file on the hard disk drive (e.g., Windows Media Audio (WMA) format), or from online streaming sources.
3. Digital audio/video played from a DVD disc in the portable media drive 106, from a file on the hard disk drive (e.g., Active Streaming Format), or from online streaming sources.

Figure 2:
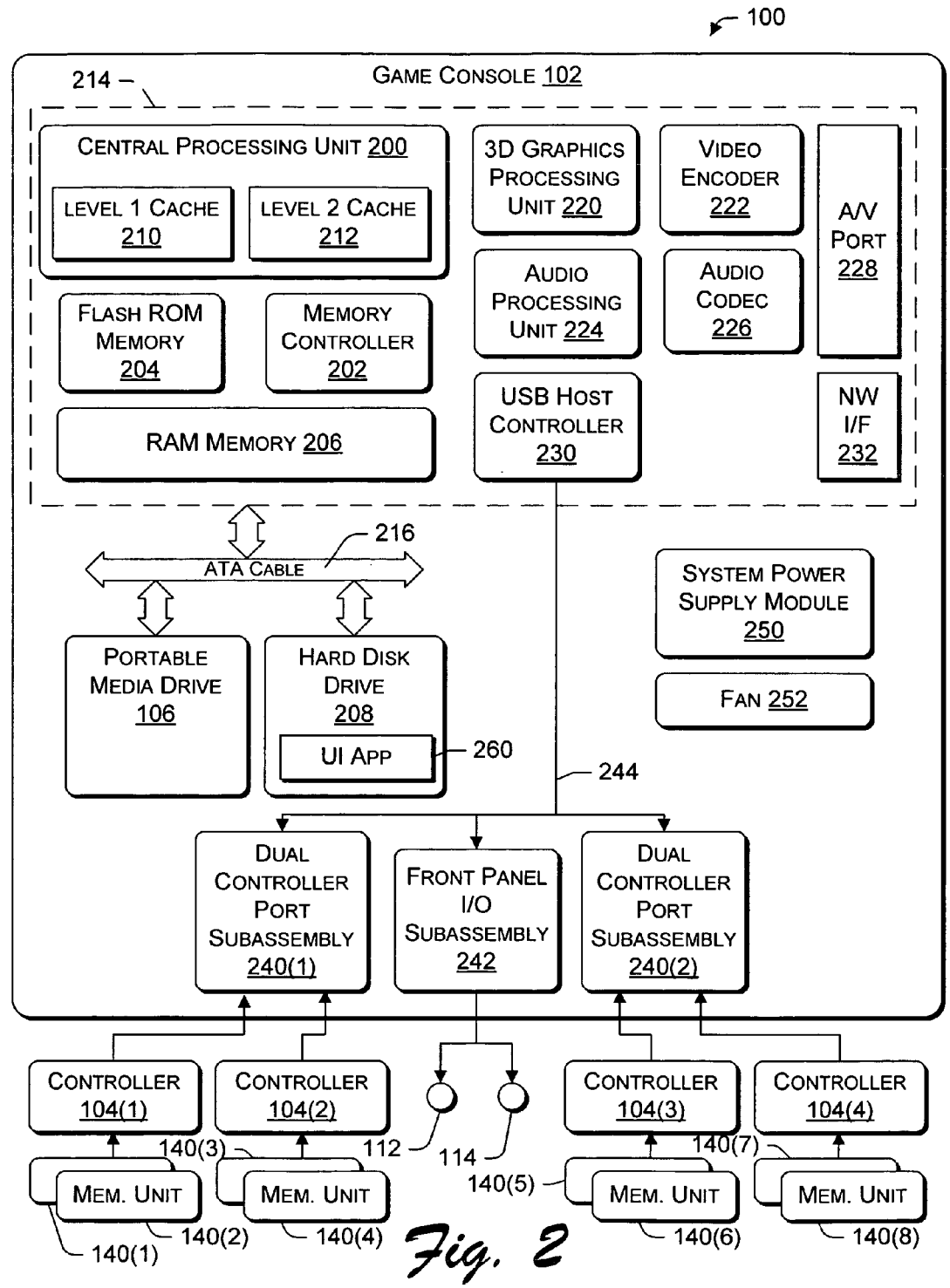
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR it SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community.

Figure 3:
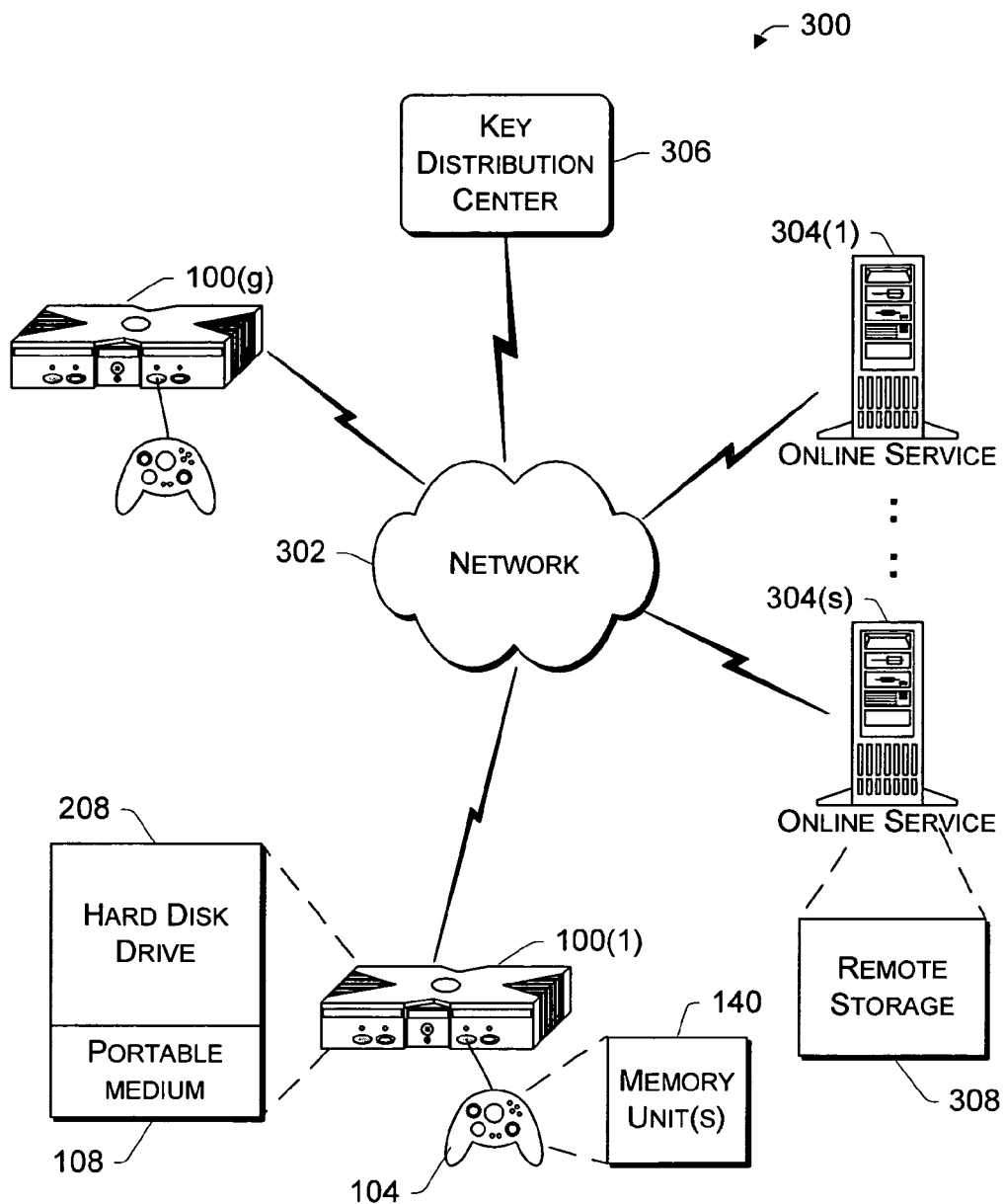
FIG. 3 illustrates a network gaming system in which the FIG. 1 gaming system is connected via a network to other consoles and services.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
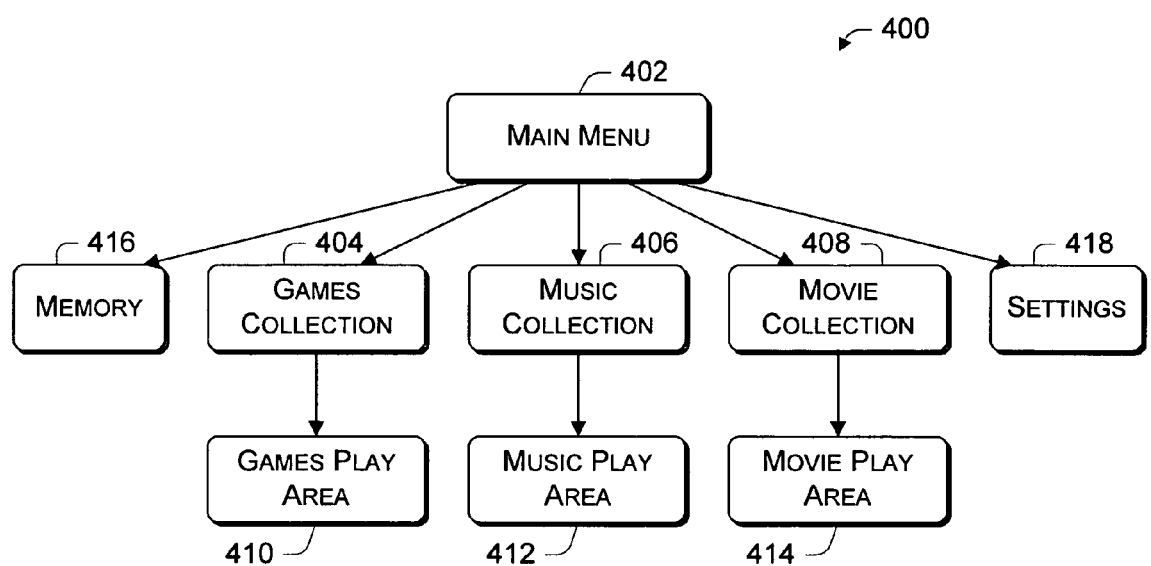
FIG. 4 illustrates a navigation hierarchy employed by the gaming system.

FIG. 4 shows the uniform media portal model 400. It provides a main menu 402 that acts as a common interface for multiple media types, including game media, movie media, and music media. The main menu 402 presents the user with a set of navigation choices that accurately describe what they would like to interact with on their console. This top-level menu is a simple representation of the three primary entertainment areas available on the console, thus presenting the following choices:

Games: This entertainment area pertains to a user's game experience and gaming media.

Music: This entertainment area is dedicated to the music context and audio media.

Movies: This entertainment area relates to a user's movie experience and video media.

The model's navigation hierarchy follows the media theme. Beneath the main menu 402 are collections of titles that pertain to their particular media types currently available to the user. In this example, a user can navigate from the main menu 402 to a games collection 404 that lists currently available game titles. Navigation may also be made to a music collection 406 that groups available music titles and a movie collection 408 that groups available movie titles. By constructing the hierarchy in terms of media type, the user is intuitively presented with titles within any given entertainment area. The titles within the various areas may be stored in any one of many storage locations, but such detail is not immediately revealed. Thus, the uniform media portal model 400 offers a coherent way to access multiple media types regardless of the media type inserted into the gaming system's portable media drive.

Area specific features, such as high scores on a game or creating a soundtrack, are left for lower levels of the model 400. Thus, beneath each collection is the specific play area that pertains to the particular media experience. A games play area 410 is navigated through the games collection 404, a music play area 412 is accessed through the music collection 406, and a movies play area 414 is navigated through the movie collection 408. This organization of the model allows users to select the context of the media type. This model thus provides a high-level "filter" on the kinds of media available on the console, and what operations may be performed with respect to the media.

The model 400 also accommodates system areas, including a memory area 416 and a settings area 418. The memory area 416 allows users to view memory contents and manage the memory devices in the console. The settings area 418 allows users to preview currently set options, as well as adjust the settings as desired.

The console application 260, which implements the uniform media portal model 400, is stored in the hard disk drive 208 of the console 102. The console application 260 is loaded each time the console is powered on. When power is initially applied and before presenting the main menu or loading a title, the console application 260 runs through an initialization cycle.

Figure 5:
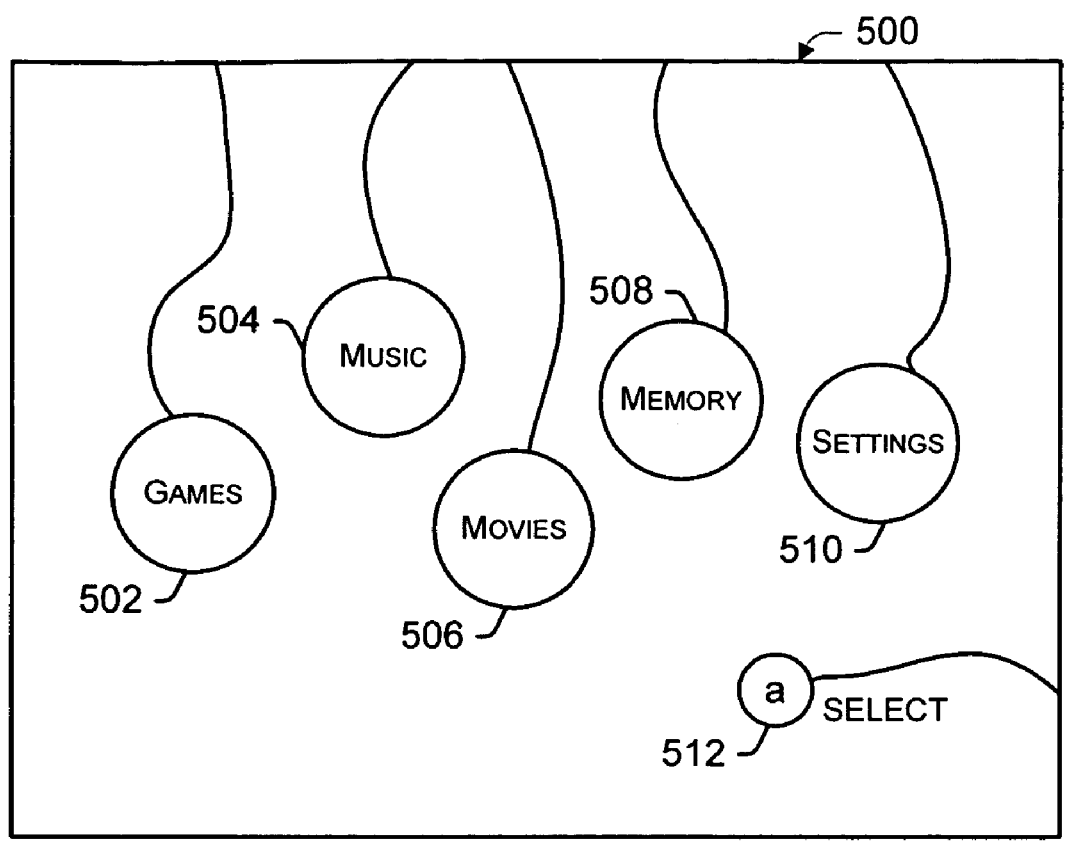
FIG. 5 illustrates a graphical user interface depicting the main menu of the gaming system.

FIG. 5 illustrates an exemplary graphical user interface 500 depicting the main menu of the gaming system. The main menu UI 500 is generated by the console UI application 260 and depicted on the television or other display. The main menu UI 500 contains the five menu elements: a games element 502, a music element 504, a movies element 506, a memory element 508, and a setting element 510. These elements provide the navigation entry points for the five level-one areas of the uniform media portal model 400, namely, the games collection 404, the music collection 406, the movie collection 408, the memory 416, and the settings 418. Environmental background audio may be played when entering the main menu to further enhance the user environment.

The focus on the main menu UI 500 is initially placed on the games element 502, but other default positions may be alternatively employed. Any of the four controllers 104(1)-104(4) may be used to navigate the console user interface. The main menu is navigated from left to right with any of the connected controller thumbsticks. "D-pad" and left analog thumbstick actions are treated the same. The console UI application 260 recognizes all button presses and thumbstick movements from every controller 104, so moves from multiple thumbsticks simultaneously may result in a "tug-of-war" navigation. In one implementation, the navigation does not wrap once the user has reached the far left or right extent of the main menu UI 500, thus attempting to move right once the user has reached the settings element 510 or to move left once the user has reached the games element 502 will have no effect.

A select element 512 allows the user to select the focused element from among the five main menu elements 502-510. The "A" button on the controller is used to control the select element 512, and hence the graphical select element 512 illustrates an "a" within the element. Upon selection, the console UI application navigates to the selected area.

Figure 6:
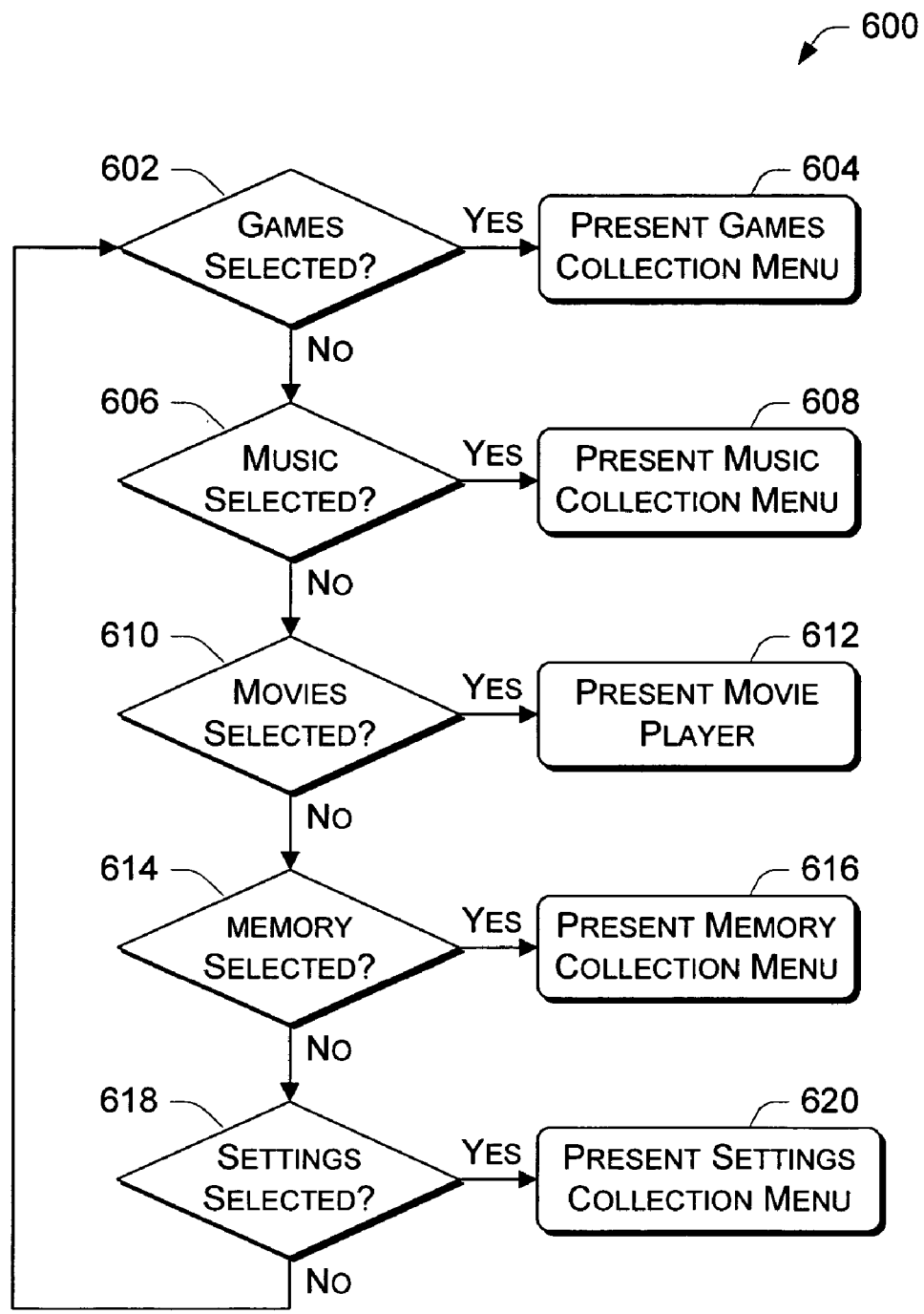
FIG. 6 is a flow diagram of the main menu navigation process that is performed after the gaming system is initialized.

FIG. 6 is a flow diagram of the main menu navigation process 600 that is performed after the gaming system is initialized. The process 600 is implemented in software as computer-executable instructions that are executed by the CPU 200 to perform the operations illustrated as blocks. The process generally discerns which main menu element is selected and navigates to the selected area.

At block 602, the console application 260 determines whether the games element 502 is selected. If so (i.e., the "Yes" branch from block 602), the console application 260 navigates to the games collection 404 and presents a games collection menu (block 604). If the games element is not selected, block 606 determines whether the music element 504 is selected. If the music element 504 is selected, the console UI application 260 navigates to the music collection 406 and presents a music collection menu (block 608). As discussed below, the music collection menu includes options to create, edit, and play soundtracks through the gaming system.

If the movies element 506 is selected (block 610), the console UI application 260 navigates to the movies collection 408 and presents a movie player (block 612). If the memory element 508 is selected (block 614), the console UI application 260 navigates to the memory area 416 and presents a memory collection menu (block 616). Finally, if the settings element 510 is selected (block 618), the console UI application 260 navigates to the settings area 418 and presents a settings collection menu (block 620).

Figure 7:
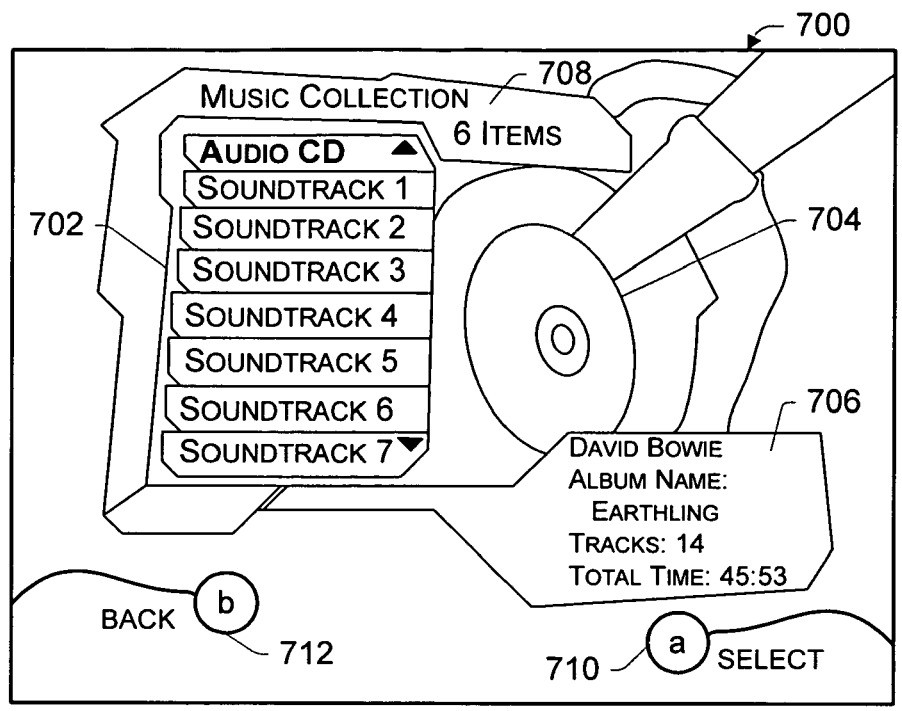
FIG. 7 illustrates a graphical user interface depicting a music collection menu that is accessible from the main menu.

FIG. 7 illustrates a graphical user interface depicting a music collection menu 700 that is presented upon selection of the music element 504 in the main menu UI 500 (FIG. 5). The music collection is the area where the user can select from available audio discs in the portable media drive 106 as well as soundtracks they have previously created and stored on the hard disk drive 208. The music collection menu 700 includes a list 702 of the available audio discs in the portable media drive (if any) and soundtrack files on the hard disk drive. An example of a suitable audio disc is a Redbook audio CD (compact disc). An example of a suitable soundtrack file is one or more WMA files copied from an audio CD, an audio DVD, a game disc, an online source, or other audio source.

An orb 704 contains a graphic of the currently selected audio item and a metatext panel 706 posts information about the current audio element. As the user navigates over the list 702 of the available audio discs and soundtracks, corresponding summary information is posted in the metadata panel 706. The following information is displayed for the currently selected audio disc or soundtrack:

Name of the audio element as it appears in the list
Total number of tracks
Total playing time for the audio element in minutes and seconds In this example, the audio CD is highlighted in list 702 and hence a CD image is presented in orb 704. As indicated by the metatext panel 706, the audio CD is the 14-track album "Earthling" by David Bowie. When network access is available, artist and other information (such as track titles and release date) can be retrieved from online services over the Internet at any time.

Descriptive text 708 (i.e., "n items") is positioned beside the main legend "Music Collection" to indicate the number of titles in the music collection. The list 702 displays a limited number of music titles (e.g., eight titles). When a user first enters the music collection after purchasing their console, there will be zero titles in the music collection (i.e., "0 items"). In this situation, the music collection menu 700 is bypassed and the user is navigated to the music player screen (shown and described below with respect to FIG. 8). The title of the music player screen is "no audio CD" and all of the playback buttons in the area are disabled. The user may only navigate back to the main menu 500 (FIG. 5).

If the user only has a single audio disc in the portable media drive, or a single soundtrack in the music collection, the user is automatically navigated past the music collection menu 700 when coming from the main menu and is taken directly to the music player screen. As the user creates multiple soundtracks and stores them in the hard disk drive, the music collection menu 700 is no longer bypassed, but instead presents the available soundtracks in the list 702. When the descriptive text 708 indicates that there are more music titles than shown on list 702 (e.g., n>8), up/down scroll arrows are added to the list 702 to represent that more titles are available.

The user can move among music titles in list 702 by using the up and down directions of the thumbstick, or some other pre-defined control mechanism. The list 702 may be configured to wrap or not wrap when the user reaches the top or the bottom of the list. A select element 710 enables user selection of the highlighted title from list 702 using the "A" button on the controller. Selection of a game title navigates the user to the music player menu. A back element 712 facilitates navigation back to the main menu UI 500 by pressing the "B" button on the controller.

Figure 8:
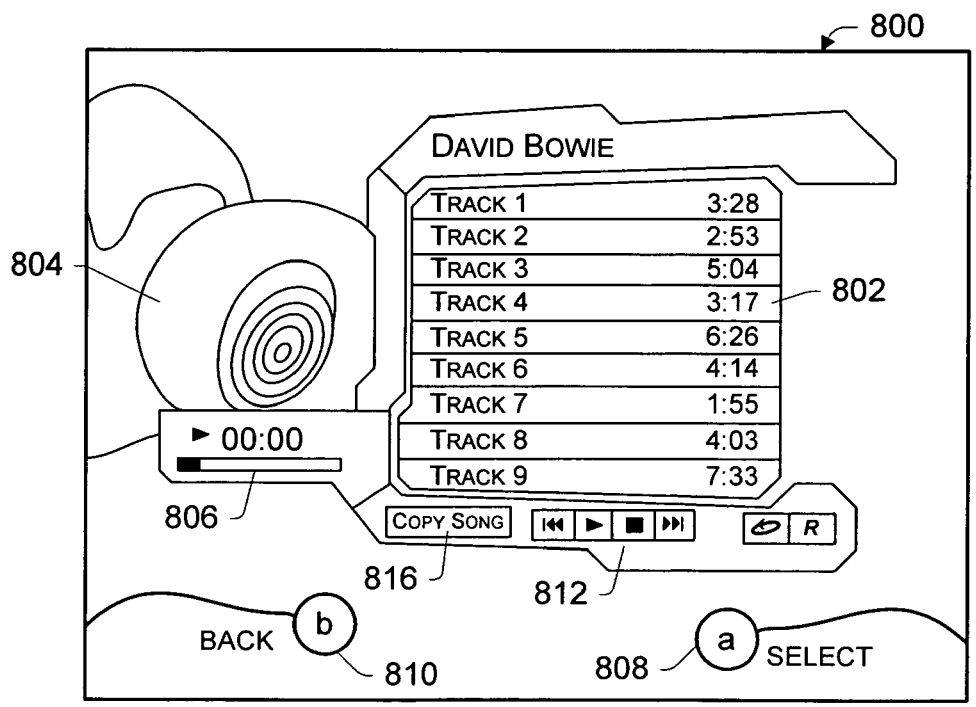
FIG. 8 illustrates a graphical user interface depicting a music player that is accessible from the music collection menu.

FIG. 8 illustrates a graphical user interface depicting an exemplary music player 800 that is accessible from the music collection menu or, where no music titles are listed, upon loading a music disc. The music player allows the user to play back the current audio disc in the portable media drive 106 or previously created soundtracks. The music player 800 includes a track list 802 of the available audio tracks and corresponding track lengths, an orb 804 that contains a radial spectrum analyzer (or other music related visual), and a status element 806 that displays the current playback status and timeline of the current track. During audio playback, the current track being played within the track list 802 is highlighted. The status element 806 renders the following information for the user:

Current time within the current track
Visual progress bar for the current track
Simple playback icons to denote playback status (e.g., play, pause, stop, repeat, random)

A transport control panel 812 is displayed along the bottom of the music player for playback control. An example control panel 812 includes a play/pause button, a stop button, a skip forward button, a skip back button, a random track selection button, and a repeat button. When the user first navigates into the music player from the main menu or the music collection, the play button in the transport control panel 812 is in focus by default. Buttons on the game controller 104 may be mapped to the transport control buttons. For example, a white button on the controller might be mapped to the play/pause toggle button, the black controller button might be mapped to the stop button, the left trigger might be mapped to the previous track button, and the Right trigger might be mapped to the next track button.

A "copy song" button 816 is also displayed in the music player UI 800. When the copy song button 816 is selected, the user is navigated into the soundtrack creation tool with the current audio disc or soundtrack as the source. The soundtrack creation tool allows one or more tracks to be copied to a soundtrack. The soundtrack creation tool is discussed in greater detail below.

A select element 808 enables user selection of the highlighted audio track from list 802 using the "A" button on the controller. A back element 810 facilitates navigation back to the previous menu by pressing the "B" button on the controller.

Figure 9:
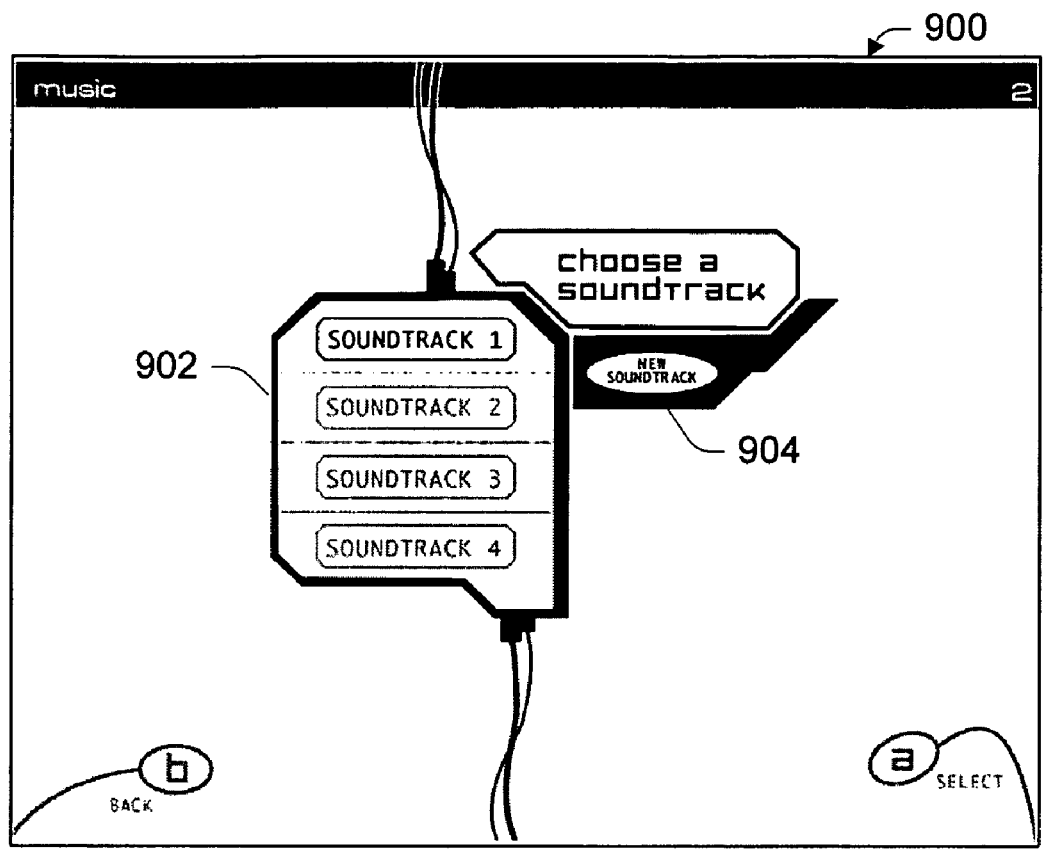
FIG. 9 illustrates a graphical user interface depicting a screen display used to select an existing soundtrack or create a new soundtrack.

FIG. 9 illustrates a graphical user interface depicting a example screen display 900 used to select an existing soundtrack or create a new soundtrack. As noted above, users can create their own soundtracks by copying audio tracks from one or more audio sources. Screen display 900 provides users with a list 902 of all soundtracks available to the gaming system. Such soundtracks may be stored on the hard disk drive 208, a portable disc medium 108 in drive 106, a memory unit 140, or at remote storage 308 at an online source 304. If the user has created at least one soundtrack, the list 902 depicts one or more placards of available soundtracks. A user entered name, or a default name "soundtrack 1", "soundtrack 2", etc., is shown on the placards.

A "New Soundtrack" button 904 is positioned beside the list to enable the user to create a new soundtrack. Upon selection of a soundtrack in the list 902 or the "New Soundtrack" button 904, the user is navigated to a track selection screen described below with respect to FIG. 12. If the user has not yet created a soundtrack, the list 902 of available soundtracks is empty. Upon choosing the "New Soundtrack" button 904, the user is presented with an area for text entry and a virtual keyboard for typing a new name for the soundtrack. By default, the name given to the soundtrack will be "Soundtrack 1", but any keyboard input from the user will replace this default title with the entered name.

Figure 10:
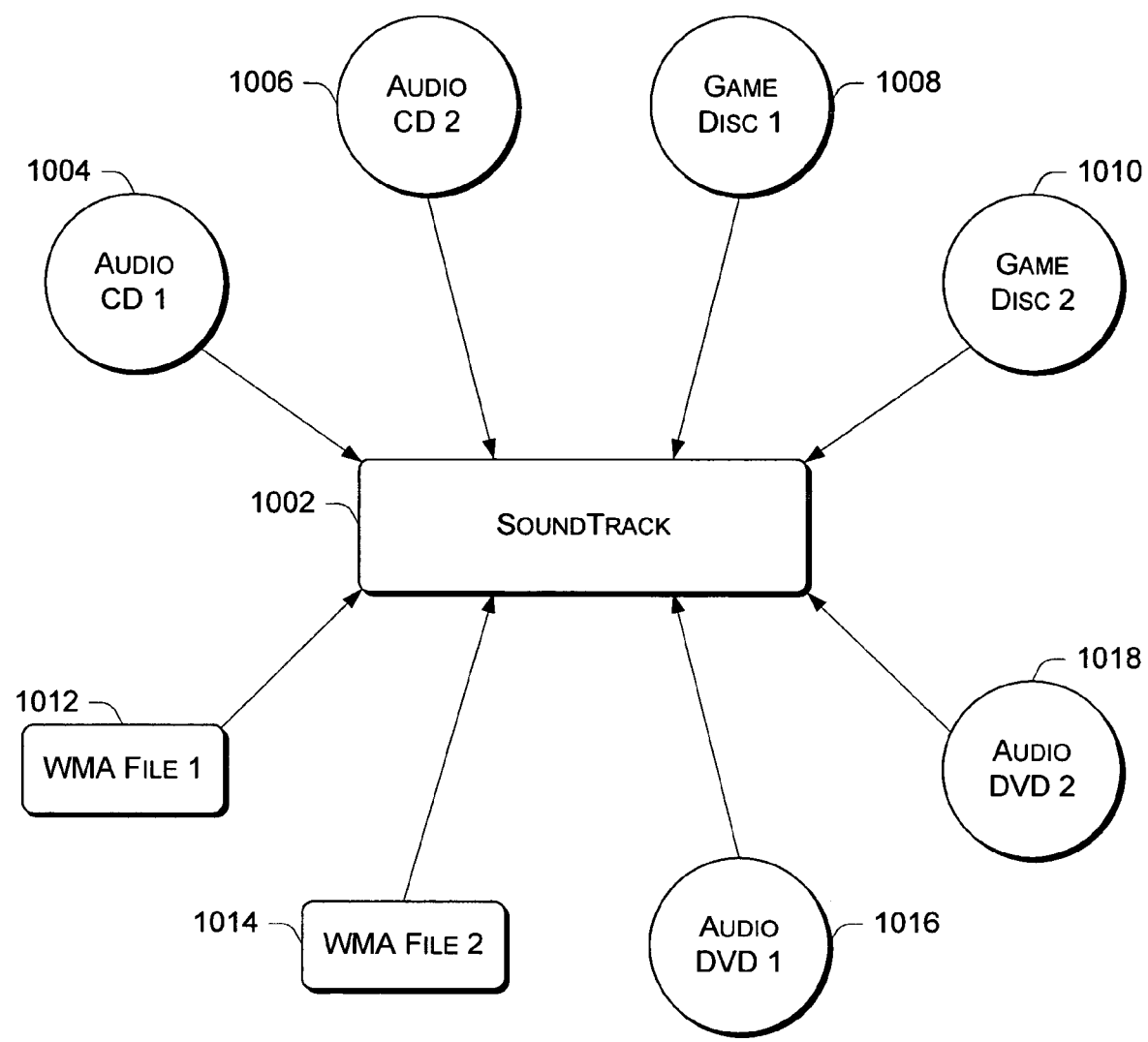
FIG. 10 illustrates the creation of a soundtrack using a variety of different audio sources.

FIG. 10 illustrates the creation of a soundtrack using a variety of different audio sources. A new soundtrack 1002 is created by selecting audio tracks from one or more different audio sources. Exemplary audio sources illustrated in FIG. 10 include audio CDs 1004 and 1006, game discs 1008 and 1010, WMA files 1012 and 1014, and audio DVDs 1016 and 1018. Although a limited number of audio sources are illustrated in FIG. 10, soundtrack 1002 can be created using audio tracks from any number of audio sources that represent any number of artists. The audio tracks that comprise soundtrack 1002 can be arranged in any order, regardless of the audio source or the time at which the audio track was retrieved or copied.

Audio CDs 1004 and 1006 typically include multiple audio tracks. Soundtrack 1002 may contain one or more audio tracks from one or more audio CDs. Game discs 1008 and 1010 may contain one or more audio tracks that are played during the game. One or more of those audio tracks may be included in the user-created soundtrack 1002. WMA files 1012 and 1014 may be stored locally on the hard disk drive or available from an online source. Each WMA file may contain one or more audio tracks. One or more audio tracks from one or more WMA files may be included in soundtrack 1002. Additionally, one or more MPEG Layer 3 (MP3) audio files (not shown) may be included in soundtrack 1002. MP3 files may be stored locally on the hard disk drive or available from an online source. Audio DVDs 1016 and 1018 typically include multiple audio tracks. Soundtrack 1002 may include one or more audio tracks from one or more audio DVDs.

Figure 11:
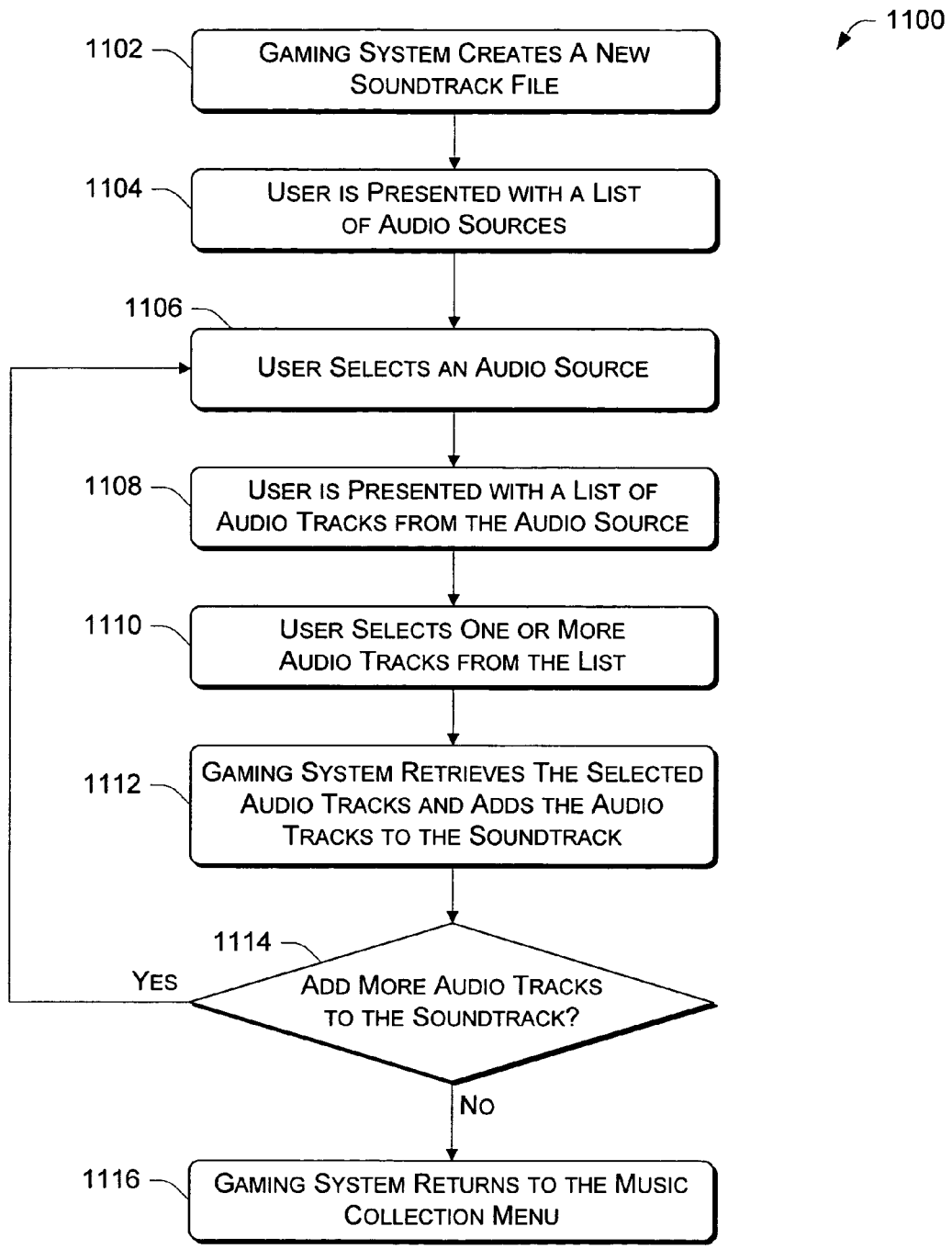
FIG. 11 is a flow diagram illustrating a process for creating a new soundtrack.

FIG. 11 is a flow diagram illustrating a process 1100 for creating a new soundtrack. The process 1100 is implemented in software as computer-executable instructions that are executed by the CPU 200 to perform the operations illustrated as blocks. Initially, the gaming system 100 creates a new soundtrack file to receive the selected audio tracks (block 1102). The user is given the opportunity to name the soundtrack. If the user does not provide a name, a default name "Soundtrack n" is applied to the soundtrack. The default name can later be changed by the user.

At block 1104, the console application 260 presents a list of audio sources from which to retrieve or copy audio tracks. Next, the user selects an audio source from the list of audio sources (block 1106). The console application 260 then presents a list of audio tracks available from the selected audio source (block 1108). The user then selects one or more audio tracks from the list to include in the soundtrack (block 1110). At block 1112, the console application 260 retrieves the selected audio tracks and adds the audio tracks to the soundtrack. If necessary, the console application 260 converts the retrieved audio files into WMA format. For example, audio tracks from an audio CD or an audio DVD are converted from their native format into WMA format prior to adding the audio tracks to the soundtrack. Similarly, MP3 files are converted from MP3 format to WMA format before adding the audio tracks to the soundtrack.

At block 1114, the console application 260 determines whether more audio tracks are to be added to the soundtrack. This determination is performed, for example, by querying the user as to whether they want to add more tracks. If additional tracks are to be added to the soundtrack, the process 1100 returns to block 1104, where the user is presented with a list of audio sources. Alternatively, the process 1100 may return to block 1106, which allows the user to select another audio track from the same audio source as the previous selection.

After all audio tracks have been added to the soundtrack, the process 1100 returns to the music collection menu (block 1116) shown in FIG. 7. At this point, the music collection menu displays the newly created soundtrack in the list of available soundtracks.

Each user of a game console 102 can have their soundtracks stored separately from the soundtracks created by other console users. For example, when a user completes the creation of a new soundtrack, the soundtrack is stored in an area on the hard disk drive associated with that user or a user attribute is stored with the soundtrack indicating the creator of the soundtrack. Thus, when a particular user identifies themselves to the game console, the game console displays the soundtracks created by that particular user.

Figure 12:
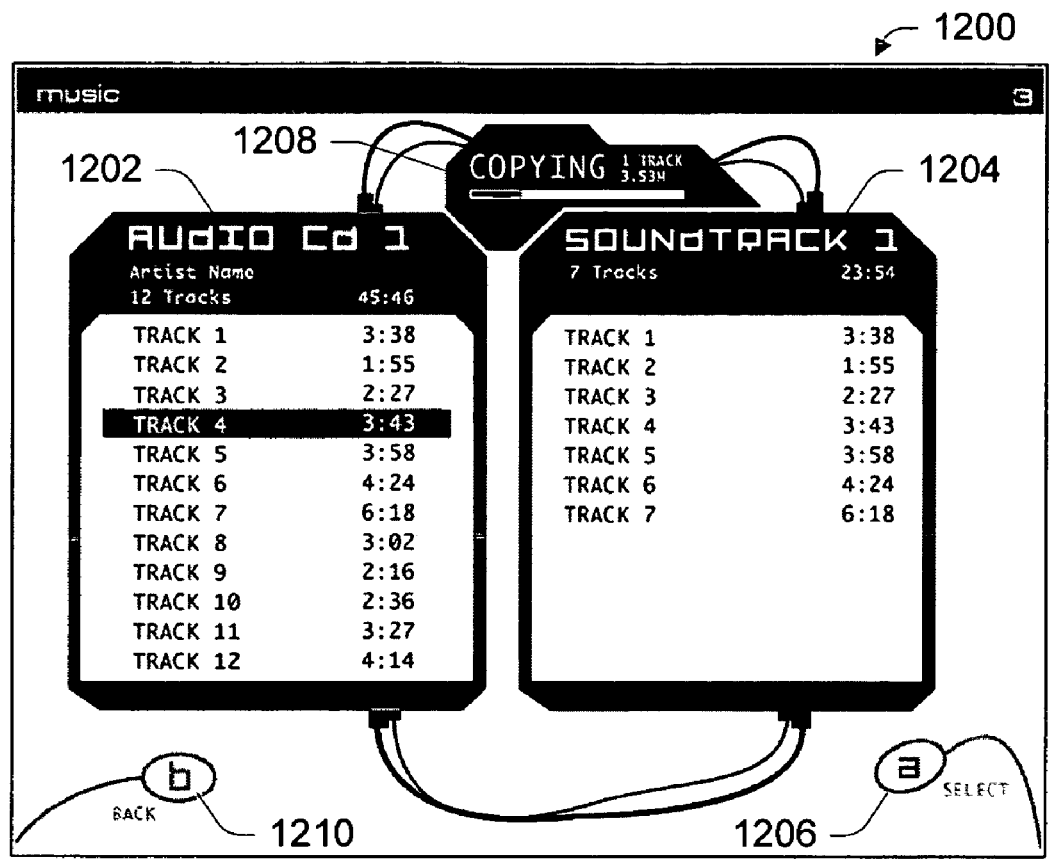
FIG. 12 illustrates a graphical user interface depicting a screen displayed during the creation of a soundtrack.

FIG. 12 illustrates a graphical user interface depicting an exemplary audio track selection screen 1200 displayed during the creation of a soundtrack. Audio track selection screen 1200 includes a list 1202 of available audio tracks (e.g., from an audio disc or an online source), and a corresponding list 1204 of audio tracks that are already in the soundtrack. The user then selects a single audio track, or multiple tracks, to be included in the soundtrack. The screen 1200 also depicts a status area 1208 that identifies the progress of the total operation. The ordering of the audio tracks in list 1204 can be adjusted by dragging a particular audio track to the desired location in the list and releasing the audio track. The list 1204 is then reordered to reflect the new location of the audio track.

A particular implementation of the audio track selection screen may include a "name soundtrack" button that allows the user to assign a name to the soundtrack. The name can be entered using a virtual keyboard or other character input mechanism. The audio track selection screen may also include a delete button that allows the user to delete a particular song from the soundtrack.

After the soundtrack is completed, a select element 1206 is activated by the using the "A" button on the controller. This select element causes the system to navigate back to the music collection menu. A back element 1210 facilitates navigation back to the previous menu by pressing the "B" button on the controller.

If the user cancels a file copy operation, those audio files being copied or retrieved will be lost. If a power off occurs while creating a soundtrack, any audio files being copied or retrieved will not be included in the soundtrack.

In a particular implementation, soundtracks are stored as one or more WMA files on the gaming system 100. Specifically, WMA files for soundtracks are stored in a flat directory on the hard disk drive 208. This directory also contains a text data file that maintains a reference of all WMA files, as well as the soundtracks to which each WMA file belongs. Because the game console manages the soundtrack directory, it is possible to keep this data file up to date. An API (application program interface) may be used to allow a game to query such information as the list of available soundtracks, the first audio file of a specific soundtrack, the last audio file of a specific soundtrack, and the next audio file in a specific soundtrack.

Figure 13:
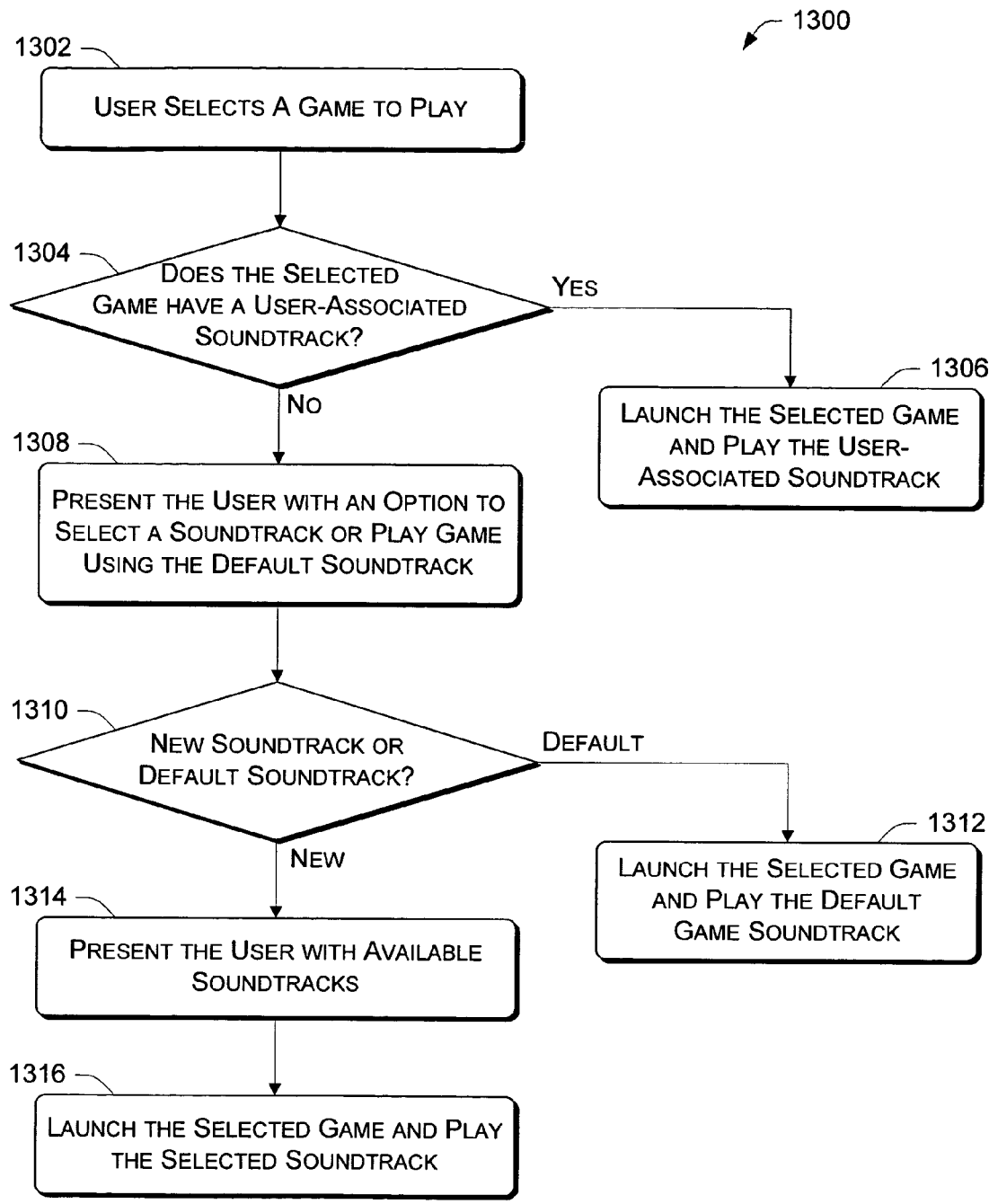
FIG. 13 is a flow diagram illustrating a process that determines which soundtrack to play when a particular game is launched.

FIG. 13 is a flow diagram illustrating a process 1300 that determines which soundtrack to play when a particular game is launched. The process 1300 is implemented in software as computer-executable instructions that are executed by the CPU 200 to perform the operations illustrated as blocks. When a user plays a game, the user can choose to listen to the game's default soundtrack or listen to a different soundtrack. If the user becomes tired of the game's default soundtrack, the user can create a new soundtrack and associate that soundtrack with the game title such that the new soundtrack is played when the game is launched instead of the game's default soundtrack. This new soundtrack is referred to as a "user-associated soundtrack."

The process 1300 begins when a user selects a game to play (block 1302). The game may be selected, for example, by inserting a game disc in the portable media drive 106, by selecting a game from list of games stored on the hard disk drive 108, or by selecting a game from an online source. The console application 260 determines whether the selected game has a user-associated soundtrack (block 1304). If the selected game has a user-associated soundtrack, the game is launched and the user-associated soundtrack is played during the execution of the game (block 1306).

If the selected game does not have a user-associated soundtrack, the console application 260 presents the user with an option to select a soundtrack or play the game using the default soundtrack (block 1308). Next, the console application 260 determines whether the user selected a soundtrack or the default soundtrack (block 1310). If the user selects the default game soundtrack, the game is launched and the default game soundtrack is played during the execution of the game (block 1312). If the user selects to choose a soundtrack, the user is presented with the available soundtracks stored on the gaming system (block 1314). The game is then launched and the selected soundtrack is played during the execution of the game (block 1316).

When the user selects a soundtrack to play instead of the default soundtrack, the user is presented with the option of making the soundtrack change "permanent." If the change is made permanent, the selected soundtrack will be played instead of the default soundtrack each time the game is played. Thus, the user is not required to select the new soundtrack each time the game is played—the system will remember the new soundtrack until the user specifically changes the soundtrack or specifically requests the gaming console to begin using the default game soundtrack.

Since the soundtrack is played from the hard disk drive, the playback of the soundtrack does not interfere with the execution of the game from the game disc. The game disc remains in the game console while the soundtrack executes, thereby eliminating the game disruptions that would occur if the game disc was removed and replaced with an audio CD. The user can change soundtracks in the middle of a game by pausing the game and selecting a different soundtrack. The game is then "un-paused" and game play continues at the point where the game was previously paused. The new soundtrack is played back from the hard disk drive while the game executes from the game disc.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:

executing a game application and playing a first soundtrack on a gaming system;

pausing execution of the game application in response to receiving a request to play a different soundtrack; and resuming execution of the game application and playing the requested soundtrack on the gaming system.

2. A method as recited in claim 1 further comprising identifying the requested soundtrack after receiving the request to play a different soundtrack.

3. A method as recited in claim 1 wherein playing the requested soundtrack on the gaming system includes retrieving the requested soundtrack from a storage device contained in the gaming system.

4. A method as recited in claim 1 wherein playing the requested soundtrack on the gaming system includes retrieving the requested soundtrack from a hard disk drive contained in the gaming system.

5. A game console comprising:

means for executing a game application and playing a first soundtrack;

means for pausing execution of the game application in response to a request to play a different soundtrack; and means for resuming execution of the game application and playing the requested soundtrack on the gaming system.

6. A game console as recited in claim 5 further comprising means for identifying the requested soundtrack after receiving the request to play a different soundtrack.

7. A game console as recited in claim 5 wherein the requested soundtrack is stored on a storage device contained in the game console.

8. A game console as recited in claim 5 wherein the requested soundtrack is stored on a storage means coupled to the means for executing the game application.

9. A game console as recited in claim 5 further comprising means for displaying a list of available soundtracks to a user of the game console.

10. A game console as recited in claim 9 further comprising means for identifying a user-selected soundtrack selected from the list of available soundtracks.

11. One or more computer-readable media having stored thereon a computer program that, when executed by one or more processors, causes the one or more processors to:

execute a game application and play a first soundtrack on a gaming system;

receive a request to select a different soundtrack;

pause execution of the game application;

determine a new soundtrack to be played; and resume execution of the game application and play the new soundtrack on the gaming system.

12. One or more computer-readable media as recited in claim 11 wherein the one or more processors further:

display a list of available soundtracks to a user of the gaming system; and identify a soundtrack selected by the user of the gaming system.

13. One or more computer-readable media as recited in claim 12 wherein the list of available soundtracks is generated by identifying soundtracks stored on a hard disk drive in the gaming system.

14. One or more computer-readable media as recited in claim 12 wherein the list of available soundtracks is generated by identifying soundtracks associated with the user of the gaming system.

15. One or more computer-readable media as recited in claim 11 wherein the first soundtrack is stored on a storage device in the gaming system.

16. One or more computer-readable media as recited in claim 11 wherein the first soundtrack is stored on a hard disk drive contained in the gaming system.

17. One or more computer-readable media as recited in claim 11 wherein the first soundtrack includes a plurality of audio tracks retrieved from a plurality of sources.

18. A gaming system comprising:

means for executing a game application and playing a first soundtrack associated with the game application;

means for pausing execution of the game application in response to a request to select a different soundtrack;

means for identifying a new soundtrack; and means for resuming execution of the game application and playing the new soundtrack.

19. A gaming system as recited in claim 18 further comprising means for associating the new soundtrack with the game application.

20. A gaming system as recited in claim 18 further comprising means for storing a plurality of soundtracks.

* * * * *